Oct. 17, 1944.                W. S. BUTTLES                2,360,757
                                MOUNTING
                           Filed Aug. 20, 1941
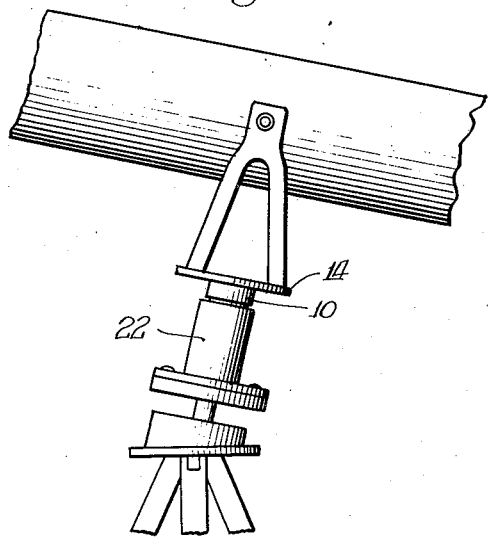
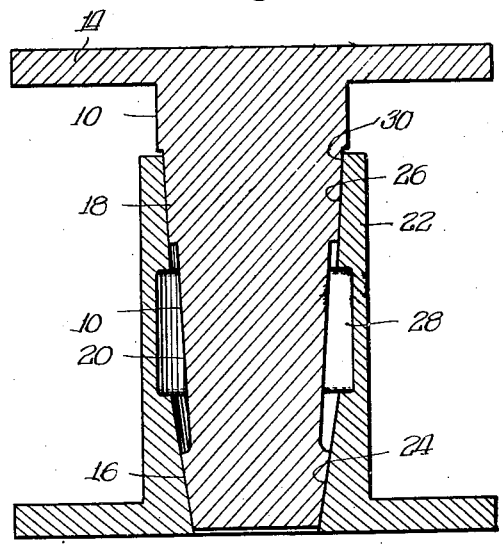
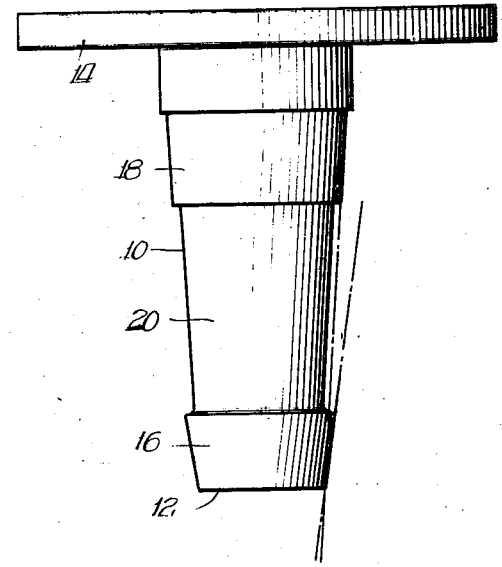
INVENTOR.
William S. Buttles, deceased.
Lois I. Buttles administratrix.
By Cromwell, Dreist + Warden
                              attys.

Patented Oct. 17, 1944

2,360,757

UNITED STATES PATENT OFFICE 2,360,757

MOUNTING

William S. Buttles, deceased, late of Chicago, Ill., by Lois I. Buttles, administratrix, Chicago, Ill., assignor to Lois I. Buttles, individually Application August 20, 1941, Serial No. 407,600

6 Claims. (Cl. 248—186)

The present invention relates to an improvement in a mounting and more particularly in a mounting that will tend to hold a given position without seizing or binding.

In telescopes usable in the field for astronomical research and in other uses, the instrument most frequently rests upon a mounting tilted at an angle to the horizontal. Where a normal pintle and socket mounting is used so that the instrument may be taken apart or dismounted for carrying purposes, the metal to metal contact between the socket and pintle in a cone tends to seize and hold the parts against a turning or pivoting movement.

Grease is often applied to the parts as a lubricant but this not only makes a relatively filthy job of assembly and disassembly, but it also makes an accurate observation or alignment impractical. The lubricated parts permit the instrument to pivot too easily, allowing the instrument to drift or turn off its predetermined alignment and swing to a balanced position. It is not always feasible to lock the instrument into position because of the necessity of taking different observations or of attaching an accurate timing device to permit the telescope to follow a specific heavenly body through its course over a period of time.

An object of the present invention is to provide a pivotal mounting that, while tending to wedge to hold an object in a predetermined position, will have less tendency to seize upon itself preventing a desired pivoting movement.

Another object is to provide a simple, inexpensive mounting that will hold at a predetermined position without locking.

A further object is to provide a mounting that will pivot easily without added lubrication.

Other and further objects will be apparent to those skilled in the art from an understanding of the description and the drawing attached hereto wherein one embodiment of the invention is set forth for purposes of exemplification.

In the drawing:

Fig. 1 is a schematic view showing one use to which the invention may be put;

Fig. 2 is a view in section through the central portion of the mounting; and

Fig. 3 is a view in side elevation of the pintle, or shaft.

In actual use it has been found that a pintle and sleeve mounting having a single tapered bearing section or several bearing sections tapered along a single angle will tend to seize and bind unless lubricated with grease or other matter. This is especially true of the more acute angled tapers unless a bearing shoulder is utilized that will prevent the tapered portions from coming into too close contact. Such a shoulder permits a free pivoting movement of the mounting so that a member positioned thereon may be rapidly and easily spun around. There are many uses in which such a free pivot is not desired and when it is necessary that the pivot hold at a predetermined point without locking, binding or seizing.

In overcoming these objections and to accomplish the objects of the invention a pintle or shaft is provided with a plurality of bearing surfaces tapered at varying angles to its axis with the angles converging toward the shaft axis in the same direction. A sleeve or socket is provided with complementary bearing surfaces so that the shaft may be telescoped within the socket with the respective bearing surfaces in proper alignment.

In the embodiment shown in the drawing the shaft 10 is generally conical in configuration, being truncated at one end 12 and formed with a mounting surface 14 at its other end. An inner bearing surface 16 and an outer bearing surface 18 are formed along the tapered body portion of the shaft with a relieved portion 20 between them.

As shown, the bearing surface 16 has a less acutely angled taper than the outer bearing surface 18. While either of these surfaces may have the more acutely angled taper, the relation as shown seems to have some advantages over the other arrangement.

A sleeve or socket 22 is provided with a bearing surface 24 complemental to surface 16 and a bearing surface 26 complemental to surface 18. The socket between these surfaces 24 and 26 may have the relieved portion 28. The shoulder member 14 is shown spaced slightly from the end of the mouth 30 of the sleeve.

With this arrangement of parts it has been found that while there is a desirable tendency for the socket and shaft to wedge, thus preventing too free a pivoting movement, the parts have a tendency not to seize or bind one another in preventing a pivoting movement. Therefore, a pivoting action is obtainable by manual force while the parts will remain as set when the manual force is discontinued and will hold an instrument, such as a telescope mounted on the shoulder 14, in a predetermined position even though the axis of the mounting be tipped at an angle to the horizontal, such as in alignment with the polar axis.

The theory of the action of this mounting is not completely understood. It is believed, however, that the wedging action is produced principally by the more acutely angled taper. It is known that if all the bearing surfaces had this same taper there would be a tendency for the parts to seize and bind. Such a binding action is resisted by the less acutely angled taper which apparently gradually retards the entrance of the shaft 10 into the tapered sleeve.

While this effect would be obtained regardless of whether the inner or outer bearing surface had the more acutely angled taper, with the larger diameter taper on the outer bearing surface, the wedging action of that taper is given a larger moment arm and therefore greater torque. This results in greater holding power or resistance to undesired drift in the mounting and less rapid wear because of the increased area of contact. The greater pressure due to the lower angle of taper produces more rapid wear than on the other taper, were its area not greater.

Excellent results have been obtained from a mounting wherein the bearing surface 16 of the shaft had a taper of 1.272 inches per foot while bearing surface 18 had a taper of 2.16 inches per foot. Mountings have been made and tested satisfactorily where both the shaft and socket were of steel and where one was brass and the other aluminum.

Various uses and modications of the mounting will become apparent to those skilled in the art without departing from the scope of the invention. All such modifications are intended to be included within the scope of the appended claims.

What is claimed is:

1. A mounting of the type described, having a sleeve and a shaft pivotally and telescopically receivable therein, said shaft having a plurality of bearing surfaces, each bearing surface being tapered at a different angle to the axis of the shaft from that of another bearing surface, and said sleeve having complemental bearing surfaces for the respective bearing surfaces of said shaft when said shaft is telescopically received within said sleeve, the angular relationship of said bearing surfaces being so arranged that said mounting can pivotally be sustained frictionally in any predetermined fixed position in which it is placed when the tapered bearing surfaces of each sleeve receive a downward thrust from the tapered bearing surfaces of the shaft.

2. A mounting of the type described, having a sleeve and a shaft pivotally and telescopically received within said sleeve, said shaft having a body portion generally conical in configuration with a plurality of separate bearing surfaces arranged therealong, said bearing surfaces being tapered at varying degrees to the axis of said shaft, and said sleeve having a socket portion provided with complemental bearing surfaces for the respective tapered bearing surfaces of said shaft, the angular relationship of said bearing surfaces being so arranged that said mounting can pivotally be sustained frictionally in any predetermined fixed position in which it is placed when the tapered bearing surfaces of each sleeve receive a downward thrust from the tapered bearing surfaces of the shaft.

3. A mounting as defined in claim 1, wherein the complemental bearing surfaces are spaced from each other longitudinally of the shaft and sleeve axis.

4. A mounting as defined in claim 1, wherein the taper of the bearing surfaces converge in the same direction toward the axis of the shaft.

5. A pivotal mounting, including a shaft member, a supporting member at one end of said shaft member, a tapered bearing surface on said shaft member adjacent the end having said supporting member, a second tapered bearing surface having a less acutely angled taper than the first mentioned bearing surface, both said tapered bearing surfaces converging toward the axis of said shaft in the same general direction, a sleeve for receiving said shaft in a telescopic relation, and said sleeve having complemental bearing surfaces for said first and second mentioned shaft bearing surfaces respectively, the angular relationship of said bearing surfaces being so arranged that said mounting can pivotally be sustained frictionally in any predetermined fixed position in which it is placed when the tapered bearing surfaces of each sleeve receive a downward thrust from the tapered bearing surfaces of the shaft.

6. A mounting as defined in claim 5, wherein the supporting member is spaced from said sleeve longitudinally of the axis of said shaft and sleeve by the bearing contact between said complemental sleeve and shaft bearing surfaces.

LOIS I. BUTTLES,
As administratrix of the Estate of William S. Buttles, Deceased.